United States Patent
St. Louis et al.

(10) Patent No.: US 7,448,143 B2
(45) Date of Patent: Nov. 11, 2008

(54) METHOD AND SYSTEM FOR INSERTING A PROBE

(75) Inventors: Robert T. St. Louis, Greenville, SC (US); Tyler Jacobs, Greenville, SC (US); Dennis Runyon, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 11/607,631

(22) Filed: Dec. 1, 2006

(65) Prior Publication Data

US 2008/0127504 A1 Jun. 5, 2008

(51) Int. Cl.
*G01B 3/28* (2006.01)
*G01B 21/18* (2006.01)

(52) U.S. Cl. .......................................... 33/836; 33/833
(58) Field of Classification Search ................... 33/516, 33/644, 645, 655, 832, 833, 836; 73/866.5
See application file for complete search history.

(56) References Cited

U.S. PATENT DOCUMENTS

| | | | | |
|---|---|---|---|---|
| 2,957,247 A | * | 10/1960 | Brown et al. ................... | 33/794 |
| 3,016,619 A | * | 1/1962 | Mueller ......................... | 33/836 |
| 3,936,945 A | * | 2/1976 | Jevremov ...................... | 33/836 |
| 4,165,566 A | * | 8/1979 | Lycan ........................... | 33/542 |
| 4,216,585 A | * | 8/1980 | Hatter ........................... | 33/836 |
| 6,415,526 B1 | * | 7/2002 | Buckner et al. ................ | 33/833 |
| 6,694,832 B1 | | 2/2004 | Gleason ........................ | 73/866.5 |
| 7,065,897 B2 | * | 6/2006 | Luner et al. .................... | 33/836 |
| 7,296,365 B1 | * | 11/2007 | St. Louis et al. ............... | 33/613 |
| 7,415,779 B2 | * | 8/2008 | St. Louis et al. ............... | 33/836 |
| 2007/0088366 A1 | * | 4/2007 | Fernandez .................... | 606/102 |

FOREIGN PATENT DOCUMENTS

| EP | 1835254 A1 | * | 9/2007 |
| FR | 2650067 A1 | * | 1/1991 |
| FR | 2678726 A1 | * | 1/1993 |
| SU | 1770727 A1 | * | 10/1992 |

* cited by examiner

*Primary Examiner*—R. A. Smith
(74) *Attorney, Agent, or Firm*—Dale J. Davis; Ernst G. Cusick; Frank A. Landgraff (57) ABSTRACT

A system for inserting a probe into a turbomachine. The system may include a male measurement fixture having a shaft and a female portion a housing for receiving the male measurement fixture. The male measurement fixture may include: a leg portion having a foot portion, a nipple portion and a step portion; and an indicator.

19 Claims, 6 Drawing Sheets

METHOD AND SYSTEM FOR INSERTING A PROBE

BACKGROUND OF THE INVENTION

The present application relates generally to a combustion system on a turbomachine; and more particularly to, a method and system for inserting a continuous dynamics monitoring probe about a combustion liner on a combustion gas turbine.

As part of the monitoring controls and diagnostic tools for a combustion system in a gas turbine, combustion dynamics data is typically measured and acquired. The combustion dynamics data is generally used to determine the operational health of the combustion system as a whole and also may be used to tune the combustion system to ensure operation within an appropriate balance between combustion dynamics and emissions.

Combustion dynamics monitoring systems are currently used on many classes of gas turbines. A dependable combustion measurement generally requires accurate and repeatable installation of the measurement tip of the dynamic probe of the combustion dynamics monitoring system. Improperly installed dynamics probes can lead to inaccurate readings of the combustor dynamics, possibly resulting in hardware damage and increased outages. Combustion dynamics monitoring systems typically use a depth-setting tool that assists with an accurate and repeatable installation of the dynamic probe.

There are a few possible problems with the currently known depth-setting tools. The combustion liner and flow sleeve designs vary among combustion systems. This requires a different depth setting tool for certain combustion systems. For example, but not limiting of the invention, some known depth setting tools cannot work with the combustion systems of certain combustion gas turbines sold by General Electric Company of Schenectady, N.Y. Specifically, these combustion systems include a combustion liner that has an opening larger than an opening in the casing wall and the flow sleeve. Furthermore, the combustion liner also has a specific geometry that requires a depth-setting tool with a leg having a step, which allows the tool to easily maneuver through the flow sleeve to contact a surface of the combustion liner. Currently known depth-setting tools cannot maneuver through the specific geometry of the combustion liner, and therefore current tools may allow for an inaccurate measurement of the required length of a dynamics probe.

For the foregoing reasons, there is a need for a depth-setting tool that can accommodate the geometry of certain classes of turbines. The depth-setting tool should provide for an accurate and repeatable installation of a combustion dynamics monitoring system probe and similar types of probes. The tool should include a leg having a step that allows the tool to easily maneuver through the flow sleeve and the combustion liner.

BRIEF DESCRIPTION OF THE INVENTION

In accordance with an embodiment of the present invention, a system for inserting a probe into a turbomachine, the system comprising: a system for inserting a probe into a turbomachine, the system comprising: a male measurement fixture for inserting into at least one wall of the turbomachine, the male measurement fixture measures a probe insertion depth and comprises: a shaft, wherein the shaft includes a leg portion provided near a distal end of the shaft, and wherein the leg portion includes a foot portion about substantially perpendicularly located near a distal end of the leg; at least one indicator for indicating the probe insertion depth on the shaft.

The system also comprises a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

In accordance with another embodiment of the present invention, the system comprising: a male measurement fixture for inserting into at least one wall of the turbomachine, the male measurement fixture measures a probe insertion depth and comprises: a shaft, wherein the shaft includes a leg portion provided near a distal end of the shaft, and wherein the leg portion comprises: a step portion near the distal end of the leg portion; a foot portion about perpendicularly located near a distal end of the leg, and wherein the foot portion includes a nipple portion.

The system also comprises a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

In accordance with another embodiment of the present invention A system for inserting a probe into a turbomachine, the system comprising: a male measurement fixture for inserting into at least one wall of the turbomachine, the male measurement fixture measures a probe insertion depth and comprises: a shaft, wherein the shaft includes a leg portion provided near a distal end of the shaft, and wherein the leg portion comprises: a step portion near the distal end of the leg portion; a foot portion about perpendicularly located near a distal end of the leg, and wherein the foot portion includes a nipple portion; at least one indicator for indicating the probe insertion depth on the shaft; and wherein the at least one indicator comprises a measurement barrel mounted to the shaft, and wherein the measurement barrel functions to be selectively axially shifted on the shaft.

The system also comprises a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

DETAILED DESCRIPTION OF THE INVENTION

Certain terminology is used herein for convenience only and is not to be taken as a limitation on the invention. For example, words such as "upper," "lower," "left," "right," "horizontal," "vertical," "upward," "downward", "distal", "aft" "long", "wide", "thick", or the like, merely describe the configuration shown in the Figures. Indeed, the components may be oriented in any direction and the terminology, therefore, should be understood as encompassing such variations unless specified otherwise.

A probe holder device is a generic phrase for a combustion dynamics monitoring system assembly, which includes a probe that is positioned about the gas flow path within the combustion system. The probe holder device coupling is a generic phrase for a coupling or mounting hardware that secures the combustion dynamics monitoring assembly to a combustion can. In a combustion gas turbine (hereinafter turbine), the combustion dynamics monitoring (hereinafter CDM) probe assemblies should be mounted to the combustion can so that the probe tips are all disposed at a specific probe insertion depth.

The probe insertion depth is the distance between the inside of the combustion liner and the combustion flow path, and is measured relative to a combustion liner surface. The probe insertion depth should be identical across all CDM probes used in the turbine.

To provide for reliable, repeatable probe insertions depths, an embodiment of the present invention includes a kit for determining the probe insertion depth relative to a combustor casing wall, a flow sleeve wall, and a liner wall. The kit includes a male measurement fixture (MMF) 150 (shown, for example, in FIG. 2) for measuring the probe insertion depth, and a female measurement fixture (FMF) 300 (shown, for example, in FIG. 4) for transferring the probe insertion depth to the CDM probe assembly 400. The MMF includes a leg portion 210 corresponding in axial length to probe insertion depth.

Figure 1:
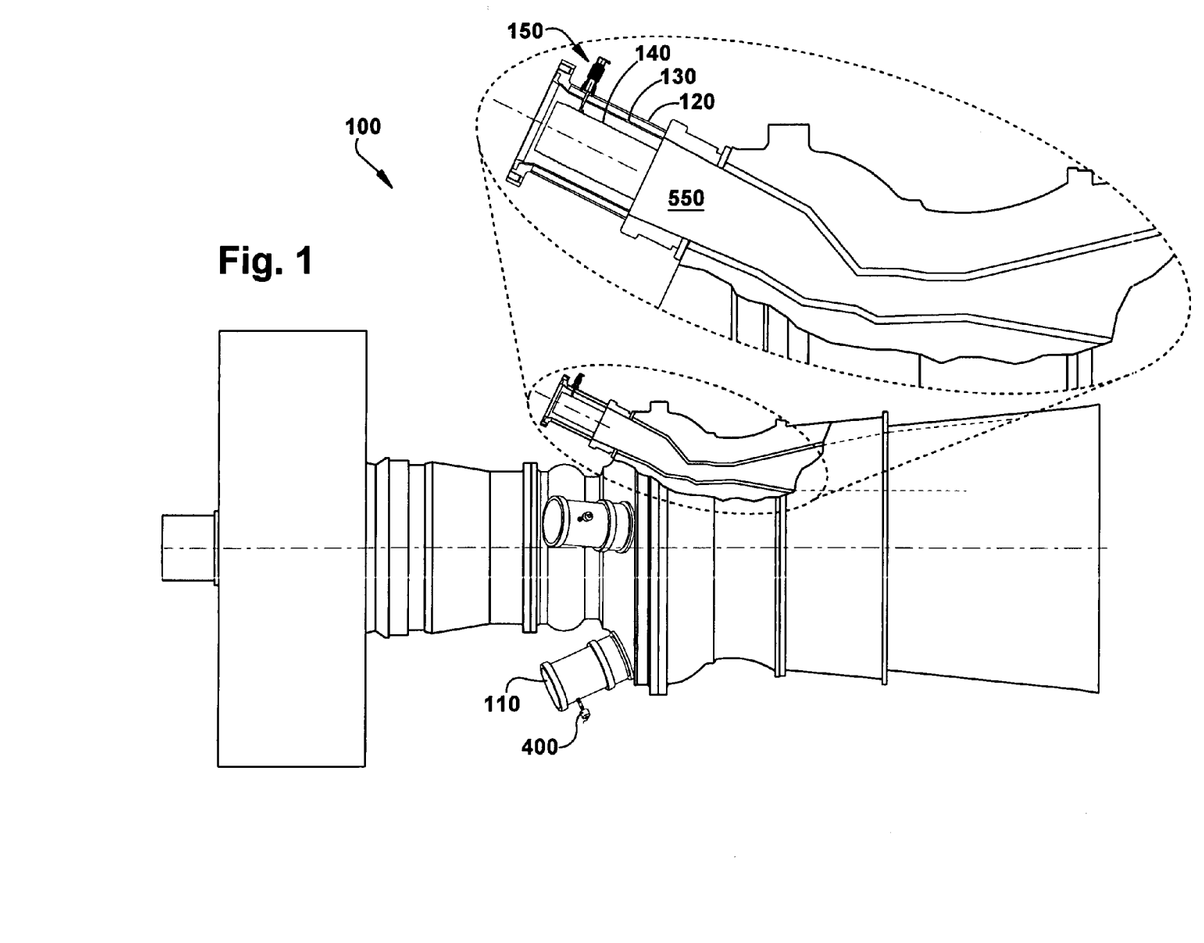
FIG. 1 is a schematic illustrating the environment in which an embodiment of the present invention operates.

Referring now to the figures, where the various numbers represent like parts throughout the several views, FIG. 1 is a schematic illustrating the environment in which an embodiment of the present invention operates. In FIG. 1, a turbine 100 includes a plurality of combustion cans 110. Each combustion can 110 comprises a first casing wall 120, a second flow sleeve wall 130, and a third liner wall 140. FIG. 1 also illustrates the MMF 150 inserted in the combustion can 110 for determining the probe insertion depth. As discussed, the probe insertion depth is determined relative to the liner wall 140 and the combustion flow path 550. FIG. 1 further illustrates that the method of the present invention affixes the CDM assembly 400 to each combustion can 110 at the proper probe insertion depth.

Figure 2:
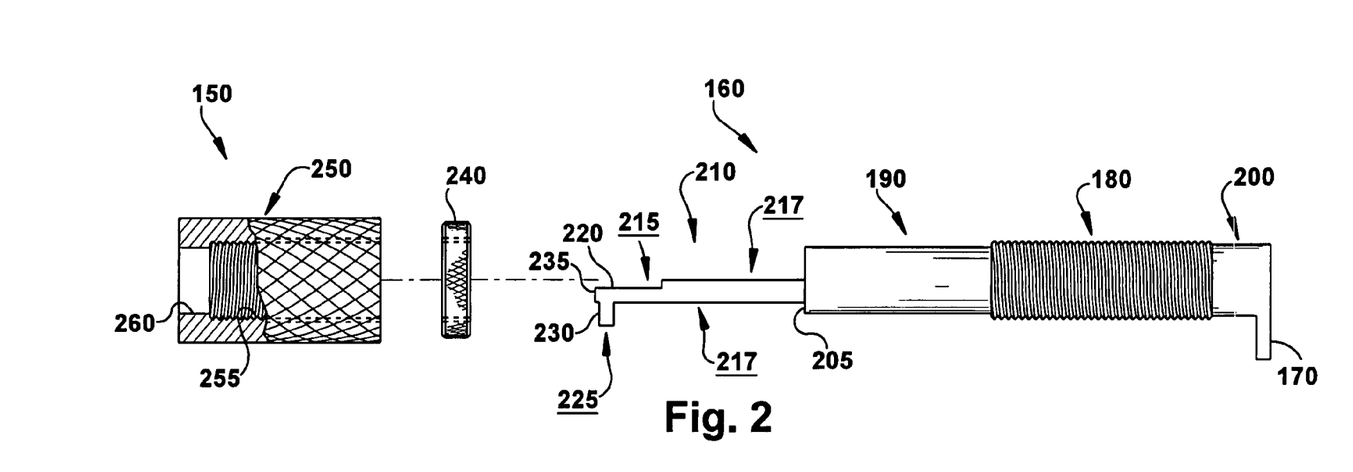
FIG. 2 is a schematic exploded view, partly in cross-section, of a male measurement fixture in accordance with an embodiment of the present invention.

Referring now to FIG. 2, which is a schematic exploded view, partly in cross-section, of a male measurement fixture (MMF) 150 in accordance with an embodiment of the present invention. The MMF 150 includes a shaft: 160, an alignment tab 170, a leg portion 210, and a lock nut 240 for locking a measurement barrel 250 in a target position.

Figure 3:
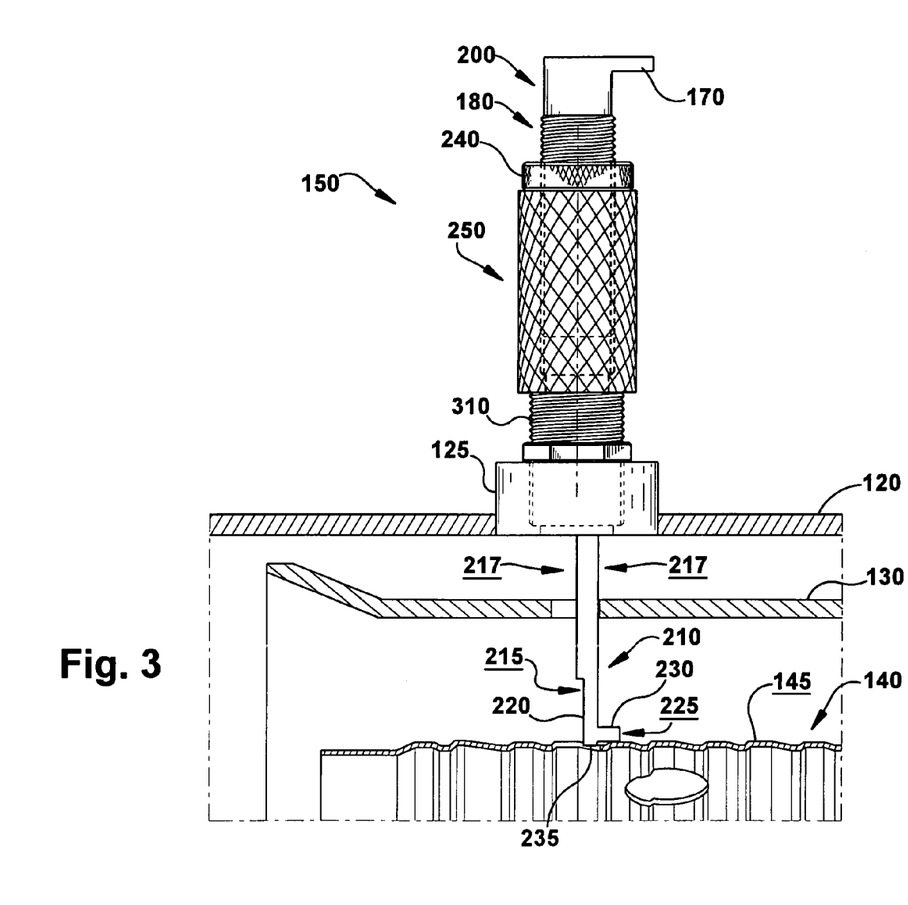
FIG. 3 is a schematic illustration of the step of measuring a target probe depth using the male measurement fixture of FIG. 2 in accordance with an embodiment of the present invention.

Referring again to FIG. 2, the shaft 160 includes a threaded portion 180, a first unthreaded portion 190, and a second unthreaded portion 200. The first unthreaded portion 190 may assist the user with maneuvering the MMF 150 while the MMF 150 is inserted into the combustion can 110 (as shown in FIG. 3). The first unthreaded portion 190 extends from a shoulder 205, defined by the difference in diameter of the shaft 160 and the thickness of the leg portion 210, to the threaded portion 180. An embodiment of the present invention may include a first unthreaded portion 190 having a length corresponding to the distance between the surface 145 of the liner wall 140 and the casing coupling 125, which generally serves as an access/insertion point, on the casing wall 120 (as shown in FIG. 3).

The threaded portion of the shaft 160 allows for an indicator to measure and maintain a probe insertion depth. The aft end of the threaded portion 160 may be located substantially adjacent to the distal end of the first unthreaded portion 190. In an embodiment of the present invention the indicator components may include a measurement barrel 250 and a lock nut 240. The measurement barrel 250 has an inner bore including a barrel smooth surface portion 260 and a barrel threaded portion 255. The barrel smooth surface portion 260 is provided to slidably engage the unthreaded portion 190 of the shaft 160, whereas the barrel threaded portion 255 is adapted to threadably engage the threaded portion 180 of the shaft 160. Providing a barrel smooth surface portion 260, as illustrated in FIG. 2, limits the proximal displacement of the measurement barrel 250 with respect to the unthreaded portion 190 of the shaft 160. It is to be understood, however, that the inner diameter of the barrel smooth portion 260 may be an optional feature of the MMF 150.

The measurement barrel 250 may advantageously have a total length generally corresponding to the length of the threaded portion 180. The barrel threaded portion 255 is generally an inner bore of the measurement barrel 250 threaded less than the total length of the measurement barrel 250 by an amount generally corresponding to the length of the lock nut 240. For example, but not limiting of the invention, if the lock nut 240 has a length of about 0.3 inches, the barrel-threaded portion 255 is about 1.7 inches. Here, when the measurement barrel 250 is fully engaged with the threaded portion of the MMF 150 and the lock nut 240 is interposed between the measurement barrel 250 and the alignment tab 170 of the shaft 160, the threaded portion 180 may be fully covered and the measurement barrel 250 should project distally from the threaded portion 180.

As mentioned, the shaft 160 also includes a second unthreaded portion 200. The aft end of the second unthreaded portion 160 may be located substantially adjacent to the distal end of the threaded portion 180. The second unthreaded portion 160 may include an alignment tab 170. The alignment tab 170 may be located at the distal end of the second unthreaded portion 160. As illustrated in FIG. 2, the alignment tab 170 may be orientated about parallel to the foot portion 230 of the leg portion 210. The alignment tab 170 may ensure that the MMF 150 is properly orientated for measuring the probe insertion depth.

The shaft 160 may be an elongated body extending from the shoulder 205 to the alignment tab 170. The leg portion 210 may be adapted to span the distance between a reference surface to an access/insertion point that is remote from the reference surface e.g., from the liner wall 140 through the flow sleeve wall 130, and through the casing wall 120, and beyond a casing coupling 125 (note: the aforementioned is illustrated in FIG. 3). For example, but not limiting of the invention, the casing coupling 125 may be a Swagelok® (Swagelok is a registered trademark of Swagelok corporation of Solon, Ohio) fitting, or the like. However, the present invention is not intended to be limited to only those types of coupling devices.

The MMF 150 also includes a leg portion 210. The leg portion 210 may correspond in axial length to a desired or target probe insertion depth inwardly with respect to a reference surface, which in the present embodiment is the surface 145 of the liner wall 140 (shown in FIG. 3).

The leg portion 210 includes a step portion 220, a foot portion 230, and a nipple portion 235. The leg portion 210 may be located substantially adjacent to the distal end of the first unthreaded portion 190. As illustrated in FIG. 2, in an embodiment of the present invention, the leg 210 is located in a position longitudinally offset from the center of the shaft 160. The offsetting of the leg portion 210 may aid a user in assembling of the lock nut 240 and the measurement barrel 250 onto the shaft 160. The offsetting may also aid the user in inserting and maneuvering the MMF 150 through the specific geometry of some combustion systems. Furthermore, at least two surfaces on the leg portion 210 may be substantially covered by a leg radius 217, which may aid the user in inserting the MMF 150 through the flow sleeve wall 130 and the line wall 140 of the combustion can 110.

Similarly, the step portion 220 may aid a user in inserting the MMF 150 into the combustion can 110 on some combustion systems. The geometry of some combustion system components require that the MMF 150 include a step portion 220 in order for the MMF 150 to engage the surface 145 (as shown in FIG. 3). Specifically, the step portion 220 allows the leg portion 210 to pass through the flow sleeve wall 130 and contact the surface 145 of the liner wall 140 (as illustrated in FIG. 3), an important step in measuring the probe insertion depth. The step portion 220 may be located adjacent the aft end of the leg portion 210. A surface on the step portion 220 may be substantially covered by a step radius 215, which may aid the user in guiding the MMF 150 through the flow sleeve wall 130 and the line wall 140 of the combustion can 110. The step radius 215 may also integrate a surface of the step portion 220 with a surface of the leg portion 210. The step radius 215 may strengthen the leg portion 210 and also allow for an increased length of the step portion 220.

The foot portion 230 may be located at the aft end of the leg portion 210. As illustrated in FIG. 2, an aft end of the foot portion should be orientated substantially parallel to the shoulder 205. A surface on the foot portion 230 may be substantially covered by a foot radius 225, which may aid the user in guiding the MMF 150 through the flow sleeve wall 130 of the combustion can 110. The foot radius 225 may also integrate a surface of the foot portion 230 with a surface of the leg portion 210. The foot radius 225 may strengthen the leg portion 210.

A foot portion 230 may engage the surface 145 and thereby aid the user in accurately positioning the MMF 150 on the surface 145 of the liner wall 140. A nipple portion 235 may be attached to the foot portion 230.

The MMF 150 may be made of a stainless steel, a standard steel, or any other similar material capable of being used within the spirit and scope of an embodiment of the present invention. Also, in an embodiment of the present invention, the MMF 150 is about 9.13 inches long, the leg portion 210 is about 4.13 inches long, with the step portion 220 about 0.68 inches long and the shaft 160 is about 5.00 inches long. In an embodiment of the present invention, the foot portion 225 is about 0.3 inches long and between about 0.40 inches to about 0.60 inches wide and the nipple portion 235 is about 0.01 inches to 0.10 inches long and 0.25 inches wide. Furthermore, in an embodiment of the present invention, the first unthreaded portion 190 is about 1.5 inches long, the threaded portion 180 is about 2.5 inches long, and the second unthreaded portion 200 is about 1.0 inches long and the alignment tab 170 is about 0.250 inches long.

Referring now to FIG. 3, which is a schematic illustration of the step of measuring a probe insertion depth using the MMF 150 of FIG. 2, in accordance with an embodiment of the present invention. Here, the MMF 150 is inserted through the casing coupling 125 opening provided on the combustor can 110 to dispose the nipple portion 235 near the surface 145 defined in the combustion liner wall 140. The MMF 150 is advanced until the foot portion 230 engages the surface 145 of the liner wall 140. The user may then orientate the alignment tab 170 to a direction that may ensure that the foot portion 230 and the nipple portion 235 is correctly positioned about the surface 145. Here, and as illustrated in FIG. 3, an aft end of the measurement barrel 250 may engage a distal end of the connector 310, and the aft end of the connector 310 may engage at least one distal surface of the casing coupling 125 As discussed, the leg portion 210 advantageously has a length corresponding to the distance that the CDM tip 420 desirably extends inwardly from the surface 145 of the liner wall 140. This distance will generally correspond to the wall thickness of the liner wall 140.

The measured probe insertion depth is then indicated, recorded, or marked on the MMF 150 at a predetermined point with respect to the combustor casing wall 120. Therefore, after the MMF 150 is inserted so that the foot portion 230 is adjacent the surface 145, the measurement barrel 250 is rotated to advance distally. After the measurement barrel 250 is in position to indicate the probe insertion depth, the lock nut 240 is advanced distally to lock the measurement barrel 250 in place. The outer surfaces of the measurement barrel 250 and lock nut 240 may be knurled to facilitate manipulation.

It is to be understood that the MMF 150 may be marked to indicate the probe insertion depth. For example, but not limiting the invention, indicia may be applied to the MMF 150 as by applying a physical mark, tape, or the like to indicate the determined probe insertion depth with respect to the combustor casing wall 120.

Figure 4:
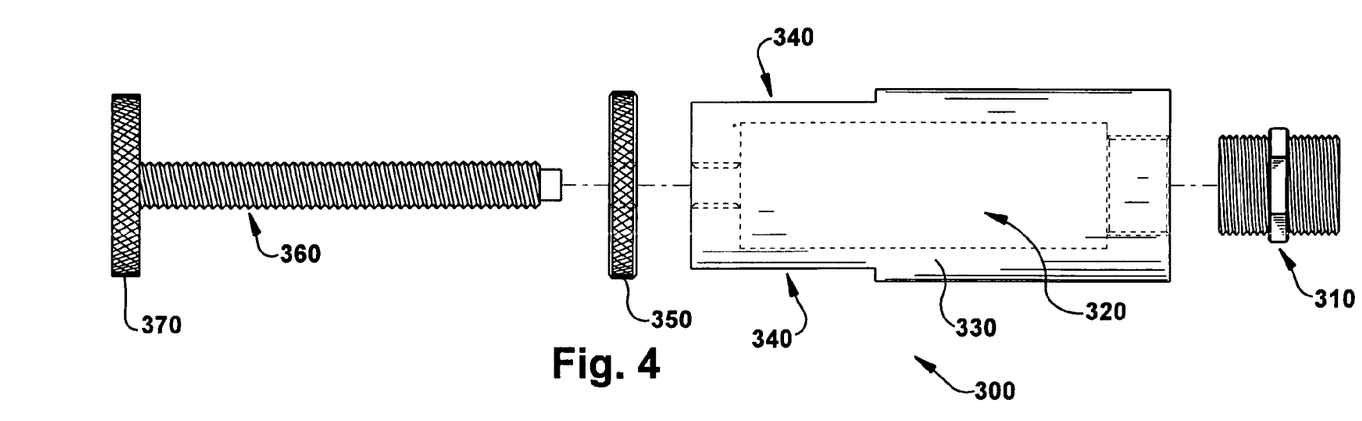
FIG. 4 is a schematic exploded view, partly in cross-section, of a female measurement fixture in accordance with an embodiment of the present invention.

Referring now to FIG. 4, which is a schematic exploded view, partly in cross-section, of a female measurement fixture (FMF) 300 in accordance with an embodiment of the present invention. The FMF 300 is provided for transferring the probe insertion depth as determined by the MMF 150 ultimately to the CDM probe assembly 400. As illustrated in FIG. 4, the FMF 300 includes at a first, open end thereof, a connector 310 corresponding that engages the casing coupling 310 provided on the combustor casing wall 120, shown for example in FIG. 3. The FMF 300 includes a receptacle 320 having an adjustable cavity area to correspond to the probe insertion depth as determined by the MMF 150. In an embodiment of the present invention, the size of the cavity in the receptacle 320 may be adjusted by the adjustment bolt 360, which is threadably engaged within the housing 330. The adjustment bolt 360 includes an adjustment head 370, which may include a knurled surface. The adjustment head 370 may be used to facilitate the displacement of the adjustment bolt 360 with respect to the housing 330. A lock ring 350 is further provided for locking the adjustment bolt 360 with respect to the housing 330. The housing 330 may include at least one flat face 340 for clamping the housing 330 to a structure during use.

The female measurement fixture 300 may be made out of stainless steel, standard steel, or any other similar material capable of being used within the spirit and scope of an embodiment of the present invention. The length of the female measurement fixture 300 may range from about 6.25 to about 6.50 inches with a width of about 1.80 to about 2.25 inches. The housing 330 may have a diameter of about 2.00 to about 2.25 inches and a length of about 3.25 to about 3.50 inches. The overall shape and size of the female measurement fixture 300 may vary depending upon the geometry of the combustion system hardware.

Figure 5:
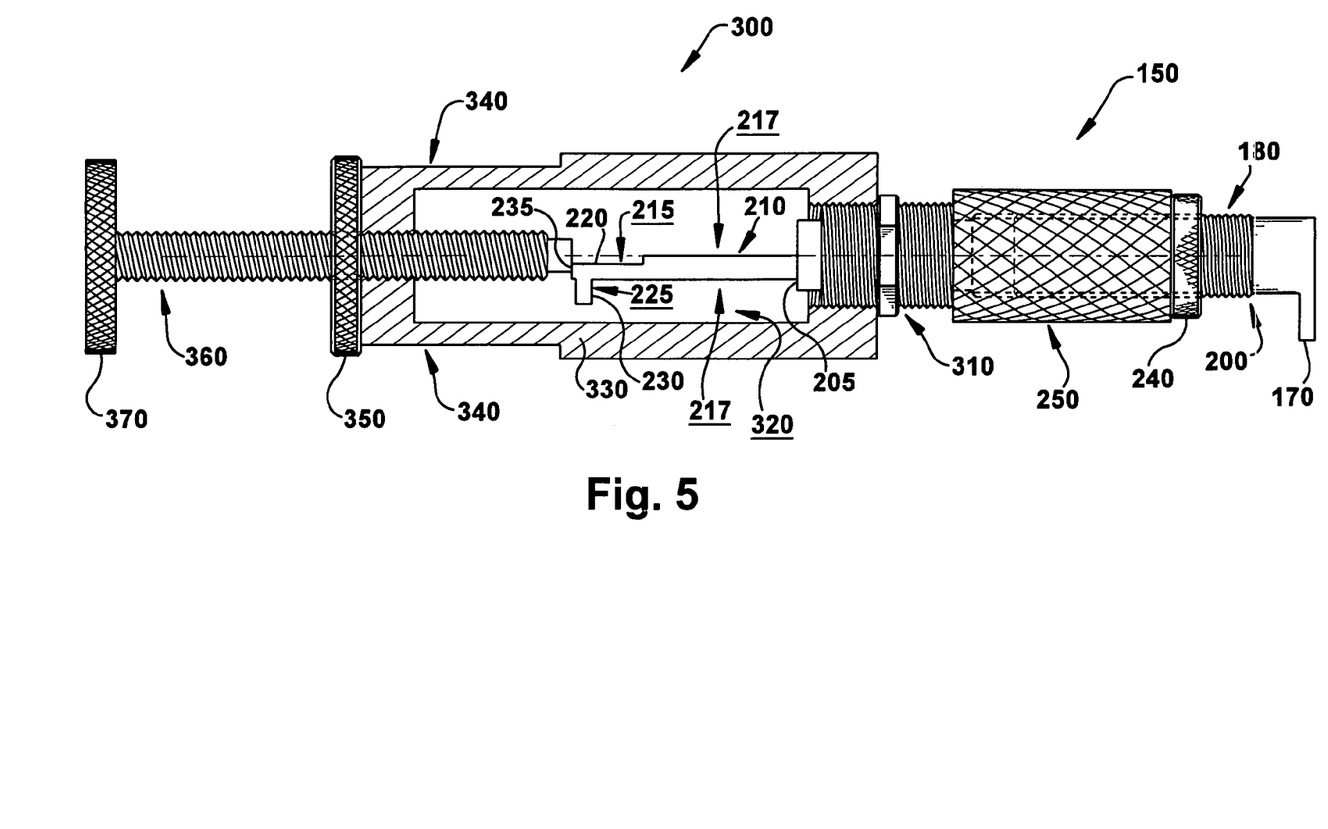
FIG. 5 is a schematic view in cross-section showing the transfer of the probe insertion depth from a male measurement fixture to a female measurement fixture in accordance with an embodiment of the present invention.

Referring now to FIG. 5, which is a schematic view in cross-section showing the transfer of the probe insertion depth from a male measurement fixture to a female measurement fixture in accordance with an embodiment of the present invention. The MMF 150 set to the probe insertion depth is slidably inserted through the connector structure 310 into the FMF 300 until the indicator thereof is aligned with a complimentary portion or feature provided on the connector 310. In an embodiment of the present invention, the measurement barrel 250 is used to the mark probe insertion depth on the MMF 150. The adjustment bolt 360 is then adjusted so that the nipple portion 235 of the MMF 150 engages the adjust bolt 360. The lock ring 350 is then tightened to lock the new position of the adjustment bolt 360. This new position is the probe insertion depth position as transferred from the MMF 150.

Figure 6:
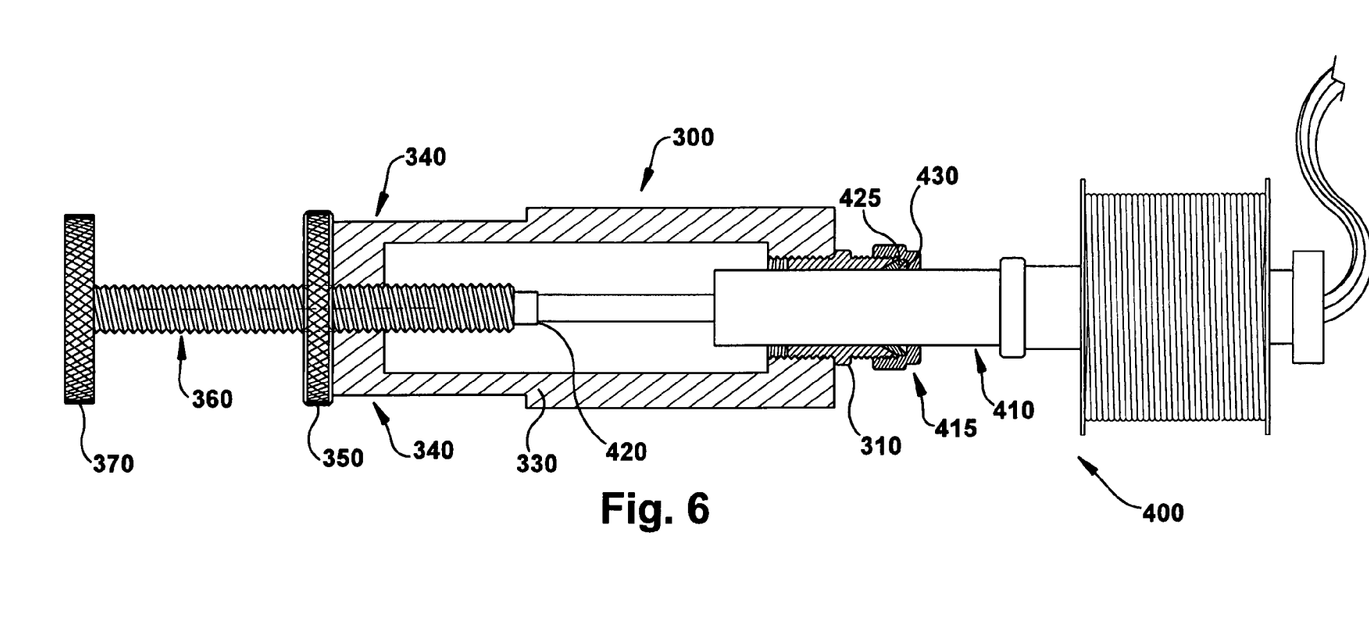
FIG. 6 is a schematic in cross-section showing the transfer of the target probe depth from a female measurement fixture to a probe holder device in accordance with an embodiment of the present invention.
Figure 7:
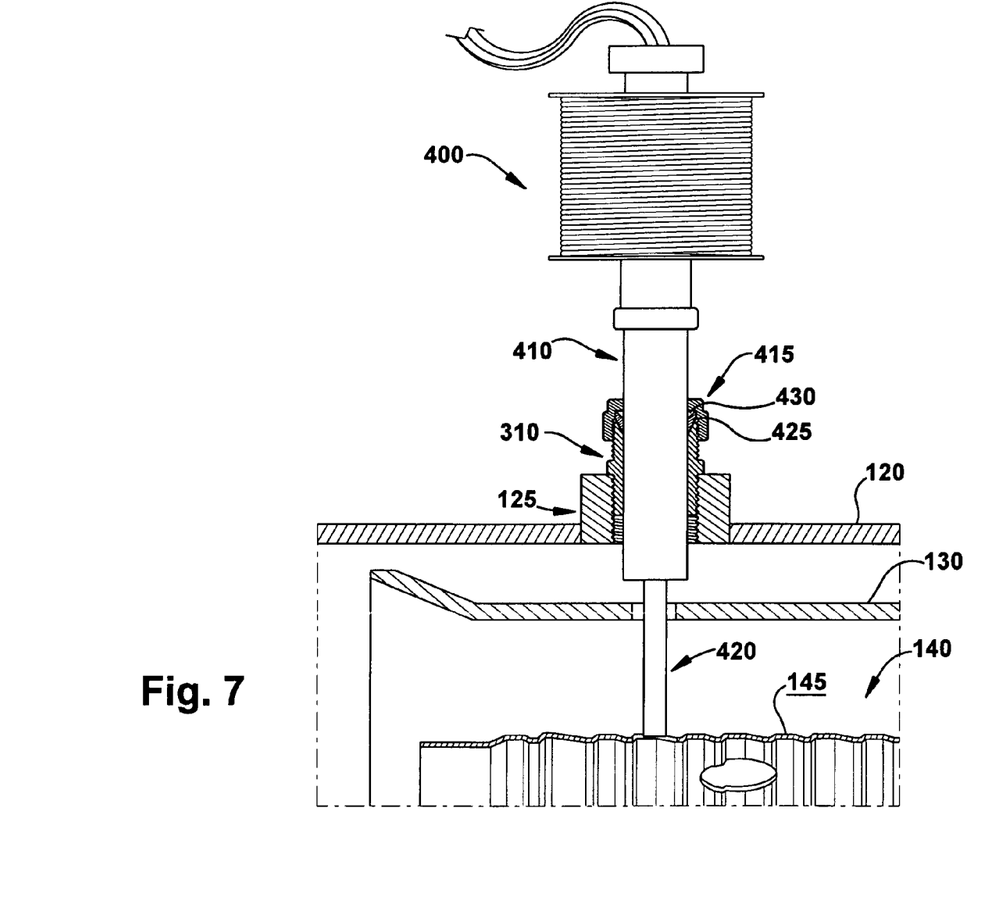
FIG. 7 is a schematic illustration of the probe holder device installed in a gas turbine combustion can.

After the lock ring 350 locks the position of the adjustment bolt 360, the MMF 150 may be removed so the FMF 300 can mark the probe insertion depth on the CDM probe assembly 400. More particularly, referring now to FIG. 6, which is a schematic in cross-section showing the transfer of the probe insertion depth from the FMF 300 to a CDM probe assembly 400 in accordance with an embodiment of the present invention. The CDM probe assembly 400 is inserted through the connector structure 310 such that the CDM tip 420 abuts the adjustment bolt 360. While the CDM probe assembly 400 is so disposed, at least one ferrule 425 and at least one collar 430 is displaced so as to align with the connector 310 of the FMF 330. The CDM connector assembly 415 may then be tightened to lock the at least one ferrule 425 in place at the correct position on the CDM shaft 410. With the probe insertion depth recorded or marked on the CDM probe assembly 400, the connector 310 can be released and the assembly 400 removed for engagement in due course with the combustion casing wall 120. Since the ferrule 425 has been locked in position on the CDM shaft 410, when the CDM probe assembly 400 is inserted through the casing coupling 125, as shown in FIG. 7, engagement of the at least one locked ferrule 425 and the at least one collar 430, with the casing coupling 125 indicates that the CDM tip 420 is properly disposed with respect to the liner wall 140.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for inserting a probe into a turbomachine, the system comprising: a male measurement fixture configured for insertion through at least one wall of a combustion can of the turbomachine, the male measurement fixture measures a probe insertion depth and comprises: a shaft, wherein the shaft comprises: a leg portion provided near a distal end of the shaft, wherein the leg portion is longitudinally offset from a center axis of the shaft; wherein the leg portion comprises a foot portion located near a distal end of the leg portion; wherein the foot portion extends laterally from the leg portion and is in the form of a tab, wherein a surface on the tab faces the shaft and is parallel to a shoulder at an extreme end of the shaft located adjacent to the leg portion, and wherein the foot portion engages a surface on the at least one wall and orients the male measurement fixture for measuring the probe insertion depth; at least one indicator for indicating the probe insertion depth on the shaft; and a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

2. The system of claim 1, wherein the leg portion includes a step portion near the distal end of the leg portion.

3. The system of claim 2, wherein the foot portion comprises a nipple portion.

4. The system of claim 3, wherein the nipple portion is located at a distal end of the foot portion and about perpendicularly located near a distal end of the step portion.

5. The system of claim 3, wherein the foot portion comprises a depth of about 0.01 inches (about 0.25 millimeters) to about 0.1 inches (about 2.54 millimeters) and a width of about 0.2 inches (about 5.08 millimeters) to about 0.3 inches (about 7.62 millimeters).

6. The system of claim 5, wherein the nipple portion comprises a depth of about 0.1 inches (about 2.54 millimeters) to about 0.3 inches (about 7.62 millimeters) and a width of about 0.04 inches (about 1.02 millimeters) to about 0.06 inches (about 1.52 millimeters).

7. The system of claim 2, wherein the step portion comprises a depth of about 0.4 inches (about 10.16 millimeters) to about 0.8 inches (about 20.32 millimeters).

8. The system of claim 1, wherein the indicator comprises a measurement barrel mounted to the shaft, and wherein the measurement barrel functions to be selectively axially shifted on the shaft.

9. The system of claim 8, further comprising a lock nut for locking the measurement barrel in position.

10. The system of claim 1, wherein the shaft includes a first unthreaded portion, a second unthreaded portion, and a threaded portion, and wherein the measurement barrel is disposed on the threaded portion.

11. The system of claim 1, wherein the at least one wall comprises: a first liner wall comprising a first opening; a second flow sleeve wall comprising a second opening; and a third casing wall comprising a third opening; wherein the third opening is larger than the second opening; and wherein the leg portion allows for maneuvering the male measurement fixture through the first opening, then the second opening and then the third opening for measuring the probe insertion depth; and wherein the leg portion of the male measurement fixture has a length corresponding to a target length of a probe tip as determined inwardly from a surface of the liner wall.

12. The system of claim 1, further comprising a connection coupling located near an open end of the receptacle of the female measurement fixture, wherein the connection coupling corresponds to a probe holder device coupling provided on at least one wall.

13. The system of claim 1, wherein an axial depth bolt adjustably mounted to the housing determines a depth of the receptacle.

14. The system of claim 1, wherein the leg is located in offset position abject to the distal end of the shaft.

15. The system of claim 14, wherein the diameter of the leg portion has a diameter less than the shaft.

16. The system of claim 1, wherein the shaft comprises an alignment tab, wherein the alignment tab is positioned adjacent an aft end of the shaft.

17. The system of claim 16, wherein the orientation of the alignment tab and orientation of the foot portion are substantially similar.

18. A system for inserting a probe into a turbomachine, the system comprising: a male measurement fixture for inserting into at least one wall of the turbomachine, the male measurement fixture measures a probe insertion depth and comprises: a shaft, wherein the shaft includes a leg portion provided near a distal end of the shaft, and wherein the leg portion comprises: a step portion near the distal end of the leg portion; a foot portion about perpendicularly located near a distal end of the leg, and wherein the foot portion includes a nipple portion; and a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

19. A system for inserting a probe into a turbomachine, the system comprising: a male measurement fixture for inserting into at least one wall of the turbomachine, the male measurement fixture measures a probe insertion depth and comprises: a shaft, wherein the shaft includes a leg portion provided near a distal end of the shaft, and wherein the leg portion comprises: a step portion near the distal end of the leg portion; a foot portion about perpendicularly located near a distal end of the leg, and wherein the foot portion includes a nipple portion; at least one indicator for indicating the probe insertion depth on the shaft; and wherein the at least one indicator comprises a measurement barrel mounted to the shaft, and wherein the measurement barrel functions to be selectively axially shifted on the shaft; and a female measurement fixture for transferring the probe insertion depth from the male measurement fixture to a probe holder device, the female measurement fixture comprises a housing defining a receptacle for receiving the shaft and the tip portion, wherein the receptacle is selectively adjustable to correspond to the probe insertion depth, and wherein the housing can receive the probe holder device in a manner to set the probe insertion depth on the probe holder device.

* * * * *